(12) United States Patent
Gillis et al.

(10) Patent No.: US 9,631,660 B2
(45) Date of Patent: Apr. 25, 2017

(54) SELF-DRILLING BOLT AND NUT ASSEMBLY

(71) Applicants: Timothy F. Gillis, Florence, MA (US); Mark Joseph Guthrie, West Springfield, MA (US); Michael W. Maziarz, Wilbraham, MA (US)

(72) Inventors: Timothy F. Gillis, Florence, MA (US); Mark Joseph Guthrie, West Springfield, MA (US); Michael W. Maziarz, Wilbraham, MA (US)

(73) Assignee: Handy & Harman, White Plains, NY (US)

( * ) Notice: Subject to any disclaimer, the term of this patent is extended or adjusted under 35 U.S.C. 154(b) by 185 days.

(21) Appl. No.: 14/578,588

(22) Filed: Dec. 22, 2014

(65) Prior Publication Data

US 2015/0104269 A1 Apr. 16, 2015

Related U.S. Application Data

(62) Division of application No. 13/127,138, filed as application No. PCT/US2010/054034 on Oct. 26, 2010, now Pat. No. 8,915,687.

(60) Provisional application No. 61/279,870, filed on Oct. 27, 2009.

(51) Int. Cl.
| | |
|---|---|
| *F16B 37/14* | (2006.01) |
| *F16B 25/00* | (2006.01) |
| *F16B 1/00* | (2006.01) |
| *F16B 25/10* | (2006.01) |
| *F16B 37/16* | (2006.01) |

(52) U.S. Cl.
CPC ........ *F16B 25/0063* (2013.01); *F16B 1/0071* (2013.01); *F16B 25/0015* (2013.01); *F16B 25/0084* (2013.01); *F16B 25/103* (2013.01); *F16B 37/14* (2013.01); *F16B 37/16* (2013.01)

(58) Field of Classification Search
CPC .......... F16B 37/14; F16B 20/10; F16B 37/00; F16B 1/0071
USPC .......... 411/429, 431, 372.5, 372.6, 377, 386, 411/387.1, 14
See application file for complete search history.

(56) References Cited

U.S. PATENT DOCUMENTS

| | | |
|---|---|---|
| 152,737 A | 7/1874 | Fletcher |
| 477,642 A | 6/1892 | Brunthaver |
| 824,330 A | 6/1906 | Barnard |
| 1,292,707 A | 1/1919 | Clark |

(Continued)

FOREIGN PATENT DOCUMENTS

JP 2004 270801 A 9/2004

OTHER PUBLICATIONS

Search Report.
Supplementary European Search Report.

*Primary Examiner* — Flemming Saether
(74) *Attorney, Agent, or Firm* — Alix, Yale & Ristas, LLP

(57) ABSTRACT

A self-drilling bolt and nut assembly includes a nut which has a window to permit visual inspection of the fastener thread upon engagement with the nut. The nut also includes a protective cap or receives a protective cap so that upon threadably engaging the fastener with the nut, the drill tip of the fastener is automatically received in the cap. The nut also has at one end a plurality of projections to enhance the locking engagement. The self-drilling bolt may have an integral washer and employ a clamping plate engageable against the washer.

11 Claims, 20 Drawing Sheets

(56) References Cited

U.S. PATENT DOCUMENTS

| | | | | |
|---|---|---|---|---|
| 1,326,008 A | * | 12/1919 | Tarbox | F16C 11/0647 29/896.7 |
| 1,456,215 A | | 5/1923 | Brightman | |
| 1,459,548 A | | 6/1923 | Morison | |
| 1,787,154 A | | 12/1930 | Hughes | |
| 1,929,116 A | | 10/1933 | Kirton | |
| 2,095,289 A | | 10/1937 | Rosenberg | |
| 2,208,532 A | | 7/1940 | Woodward | |
| 2,631,812 A | | 3/1953 | Mueller et al. | |
| 2,878,905 A | * | 3/1959 | Langermeier | F16B 37/14 138/89.3 |
| 3,022,649 A | | 2/1962 | Roller | |
| 3,093,028 A | | 6/1963 | Mathie | |
| 3,273,441 A | | 9/1966 | Biesecker | |
| 3,350,975 A | | 11/1967 | Bien | |
| 3,357,293 A | | 12/1967 | Holton | |
| 3,457,824 A | | 7/1969 | Derby | |
| 3,854,371 A | | 12/1974 | Lamothe | |
| 4,017,198 A | * | 4/1977 | Mason | F16B 7/06 29/517 |
| 4,281,699 A | | 8/1981 | Grube | |
| 4,756,654 A | | 7/1988 | Clough | |
| 4,907,929 A | | 3/1990 | Johnston Jr. | |
| 4,993,902 A | * | 2/1991 | Hellon | F16B 37/14 411/303 |
| 5,064,325 A | * | 11/1991 | McRoskey | F16B 37/00 403/320 |
| 5,356,255 A | * | 10/1994 | Takahashi | C25D 5/022 29/432.2 |
| 5,487,244 A | | 1/1996 | Hill | |
| 5,697,745 A | * | 12/1997 | Shaw | F16B 37/14 411/258 |
| 5,816,012 A | | 10/1998 | Willis | |
| 6,343,904 B1 | | 2/2002 | Wang | |
| 6,406,238 B2 | | 6/2002 | Takeuchi et al. | |
| 6,592,314 B1 | | 7/2003 | Wilson | |
| 6,688,827 B2 | * | 2/2004 | Gelb | A47G 3/00 403/11 |
| 7,008,158 B2 | | 3/2006 | Madden, III | |
| 7,172,380 B2 | | 2/2007 | Lees et al. | |
| 7,299,561 B2 | | 11/2007 | Castaneda | |
| 7,306,418 B2 | | 12/2007 | Kornblum | |
| 7,665,940 B2 | * | 2/2010 | Nilsen | F16B 7/06 411/13 |
| 8,137,042 B2 | | 3/2012 | Severns | |
| 2005/0155311 A1 | | 7/2005 | Belinda et al. | |
| 2005/0286988 A1 | | 12/2005 | Harris | |
| 2007/0160441 A1 | | 7/2007 | Reindl | |
| 2007/0183865 A1 | | 8/2007 | Severns | |
| 2007/0297855 A1 | | 12/2007 | Gerlach et al. | |

\* cited by examiner

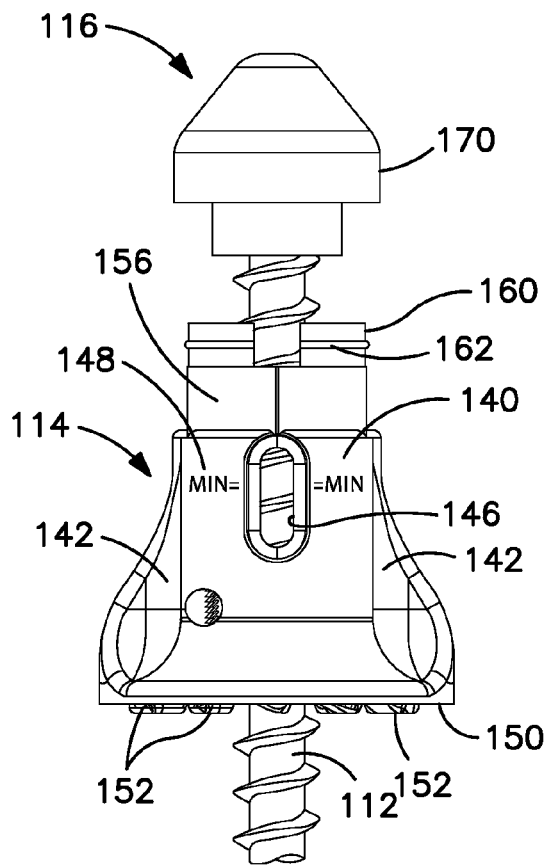
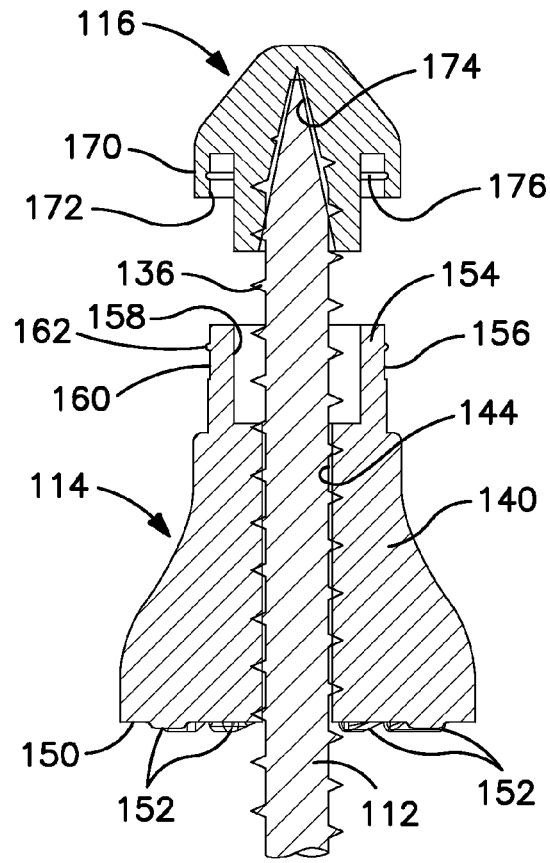
FIG. 20
FIG. 21

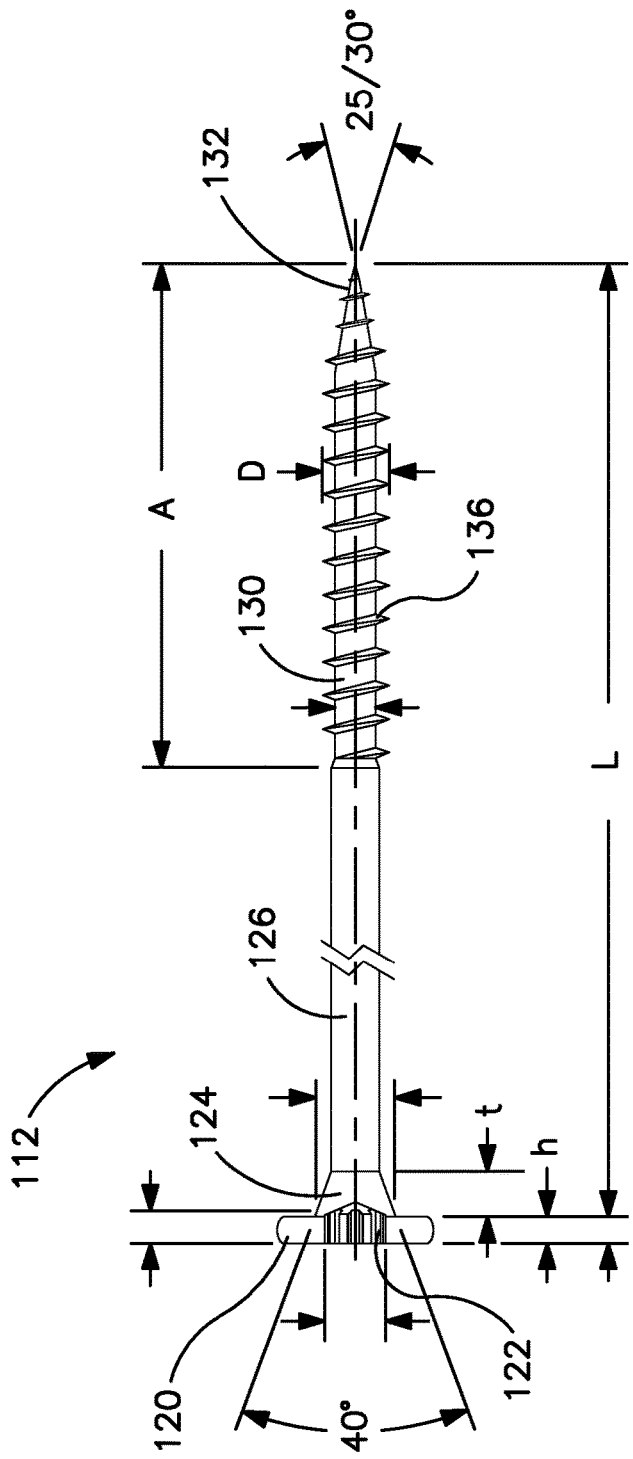
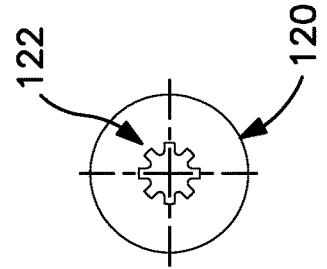
FIG. 29
FIG. 30

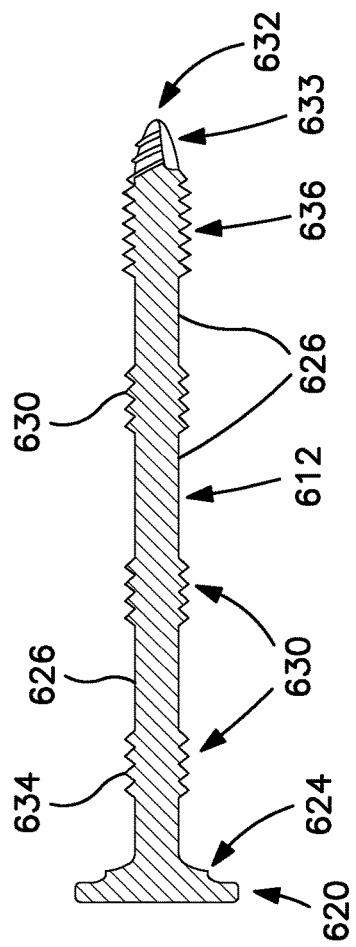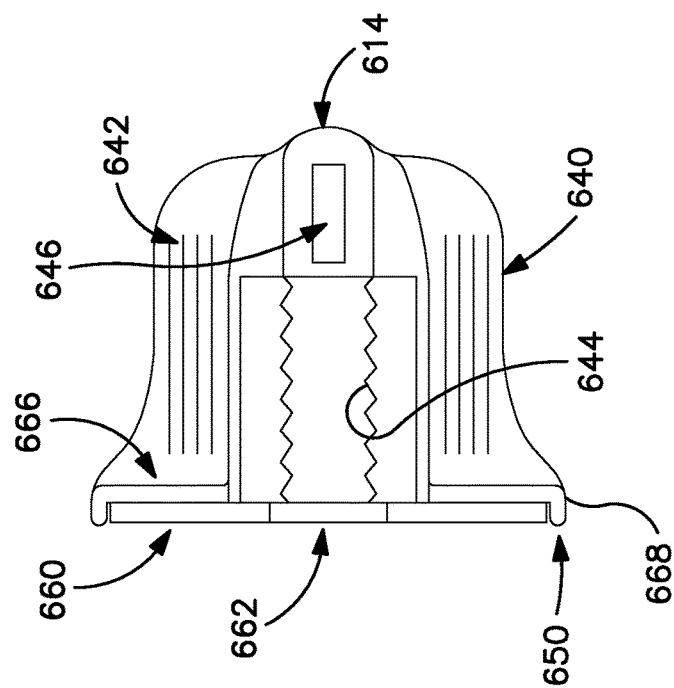
FIG. 31
FIG. 32

SELF-DRILLING BOLT AND NUT ASSEMBLY

CROSS-REFERENCE TO RELATED APPLICATION

This application is a divisional of U.S. patent application Ser. No. 13/127,138 filed on May 2, 2011, which application claims the priority of U.S. Provisional Patent Application No. 61/279,870 filed on Oct. 27, 2009, the entirety of which is incorporated herein by reference.

BACKGROUND

This disclosure relates generally to fasteners which extend through bores of adjacent members and receive a bolt for fastening together the members.

For construction applications for which the present disclosure relates, a bore is conventionally drilled through the adjacent wood members which are to be fastened together under a load. A bolt is then inserted through the bore of the members and secured by a washer and a nut. The bolt is typically quite elongated to accommodate the substantial thickness, especially when the adjacent members are 2×4, 2×6 or 2×8 beams and other relatively thick structural components.

SUMMARY

Briefly stated, a fastener/locking assembly comprises a self-drilling fastener, a nut and a cap. The fastener comprises a head and a shank extending from the head to a drill point. The shank has a first unthreaded portion adjacent the head and a portion adjacent the drill tip having a thread. The nut comprises a body having at one end a locking surface. The body has a central bore defined by an internal surface complementary to the thread. The opposite end of the nut has a cap. Upon threadably engaging the fastener with the nut and advancing the fastener relative to the nut, the drill point is received in the cap. The nut preferably includes a window and has at least two wings or other surface structure adapted for applying or receiving a torque.

The head portion may include an integral washer and a tapered transition to the shank. The shank has a first unthreaded portion adjacent the head. The first unthreaded portion has a uniform diameter and extends a substantial longitudinal distance to a first threaded portion. A second threaded portion is spaced from the first threaded portion adjacent the drill tip.

A nut, which may be of plastic or metal form, comprises a body having at one end a flange-like locking surface. The nut is adapted to threadably engage the fastener and includes an integral protective cap which covers the drill tip upon threadable engagement of the nut and the fastener. The body has a central bore defined by a surface complementary to the threaded portion of the fastener and enclosed at one end by the cap. The nut has a window which permits visual inspection of the thread upon engagement with the nut. A marking may be placed on the nut exterior in the vicinity of the window to indicate a minimum thread engagement for proper locking. The exterior surface of the nut is configured to resist or permit application of torque. The nut may include a pair of wings. The locking surface includes an arcuate array of projections.

A clamping plate has a recess which receives the washer and is mounted to the fastener shank for clamping engagement upon installation. The surface of the plate opposite the recess has an arcuate array of projections.

The fastener thread pitches, in various embodiments, are 7.3 and 7.5 threads per inch and are preferably less than 8.0 threads per inch. The length of the threaded portion and the drill portion is approximately 2 inches. Various fastener lengths may be provided. A single nut configuration is suitable for the different length fasteners. Numerous nut and cap configurations are employed.

In one embodiment, the nut has a generally cylindrical surface traversed by a circumferential retaining ring. The cap has a closed end and a proximate end traversed by an annulus, an interior wall of which has a recess which mates with the retainer ring to retain the cap with the nut. The locking surface of the nut comprises a plurality of projections.

In one embodiment, the fastener shank has a plurality of alternating threaded and unthreaded portions. During installation, a protective cap separates from the nut and is retainably mounted over the drill tip.

BRIEF DESCRIPTION OF THE DRAWINGS

FIG. 20 is an enlarged front view of a portion of a self-drilling bolt, a nut and a cap with the bolt being further engaged with the nut;

FIG. 21 is a central sectional view of the bolt, nut and cap of FIG. 20;

FIG. 29 is a side view, partly broken away, partly in section and partly in diagrammatic form, of a self-drilling bolt as may be employed in the assemblies of FIGS. 11-16, 18-21 and 24-28;

FIG. 30 is a left end view of the self-drilling bolt of FIG. 29;

FIG. 31 is a sectional view of another embodiment of a self-drilling bolt;

FIG. 32 is an enlarged sectional view of a nut which may be employed in connection with the bolt of FIG. 31;

DETAILED DESCRIPTION

Figure 1:
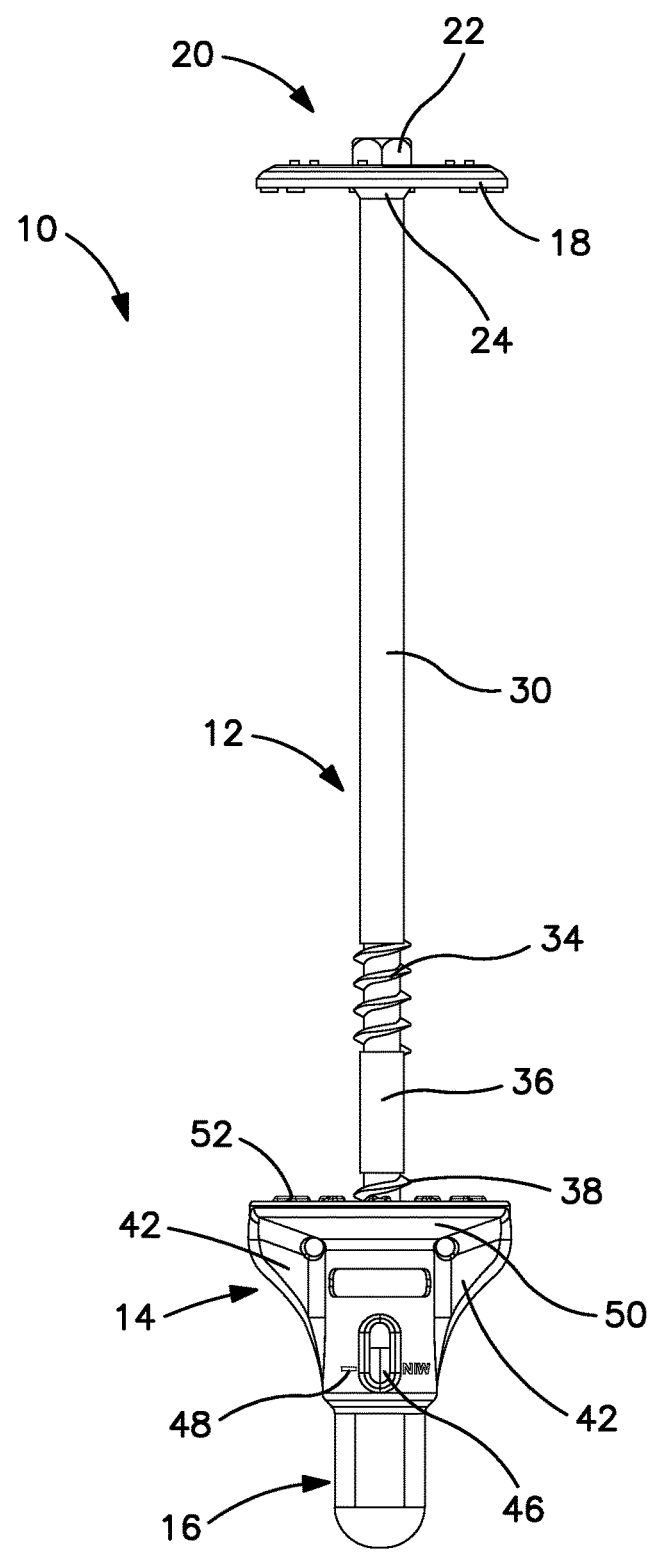
FIG. 1 is a side view of a self-drilling bolt and nut assembly illustrated in an assembled form.

With reference to the drawings wherein like numerals represent like parts throughout the several figures, a first embodiment of a fastener assembly which is employed for fastening at least two members under a load is generally designated by the numeral 10. The fastener assembly 10 is designed as an enhancement over a conventional lag bolt fastener assembly and has numerous applications. The fastener assembly 10 can be very efficiently installed and is capable of providing a reliable connection of high integrity.

In the conventional lag bolt fastener assemblies to which the fastener assembly 10 relates and is configured to replace for certain applications, a bore is drilled through members to be joined. A bolt is inserted into the bore. A threaded end opposite the bolt head protrudes away from the end of the bore. A nut is typically threaded and tightened onto the bolt end to implement the connection. One or more separate washers may also be typically employed to enhance the clamping/locking connection.

With reference to FIGS. 1-10, fastener assembly 10, in one assembled embodiment, comprises a self-drilling, self-tapping bolt 12, a nut 14 with an integral protective cap 16 and a clamping plate 18 which mounts to the bolt and is retainably engaged at the underside of the head of the bolt during installation.

The self-drilling bolt includes a head 20 and a shank 30 which extends from the head and terminates in a drill tip 32. The head includes a hex head 22. Other torque receiving structures, such as sockets, Philips slots, proprietary custom drive systems, etc., are possible. The head preferably includes an integral washer 23. A conical transition 24 at the underside of the washer extends toward the shank at an angle of 60°. The transition 24 tapers to the shank portion adjacent the underside of the head which has an elongated cylindrical non-threaded form with a uniform diameter.

Figure 3:
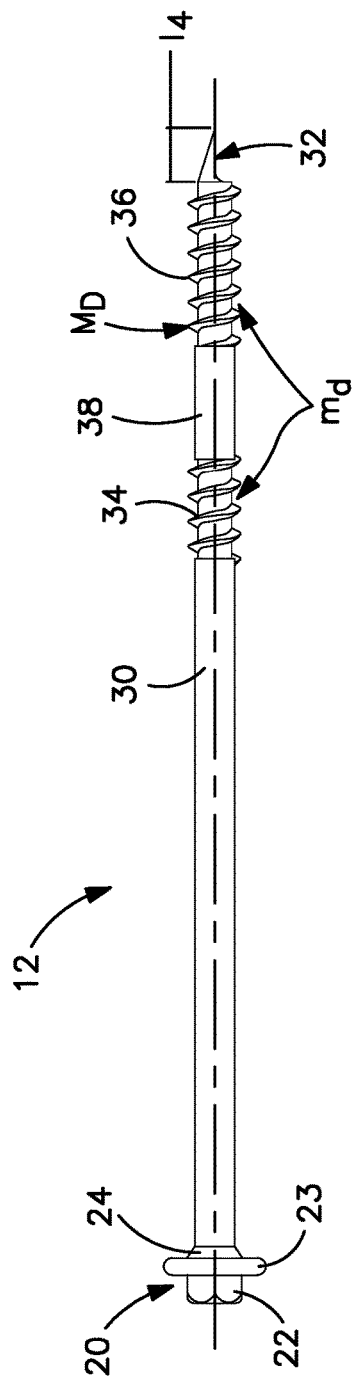
FIG. 3 is a side view, partly in diagram form, of the self-drilling bolt of FIG. 1.
Figure 4:
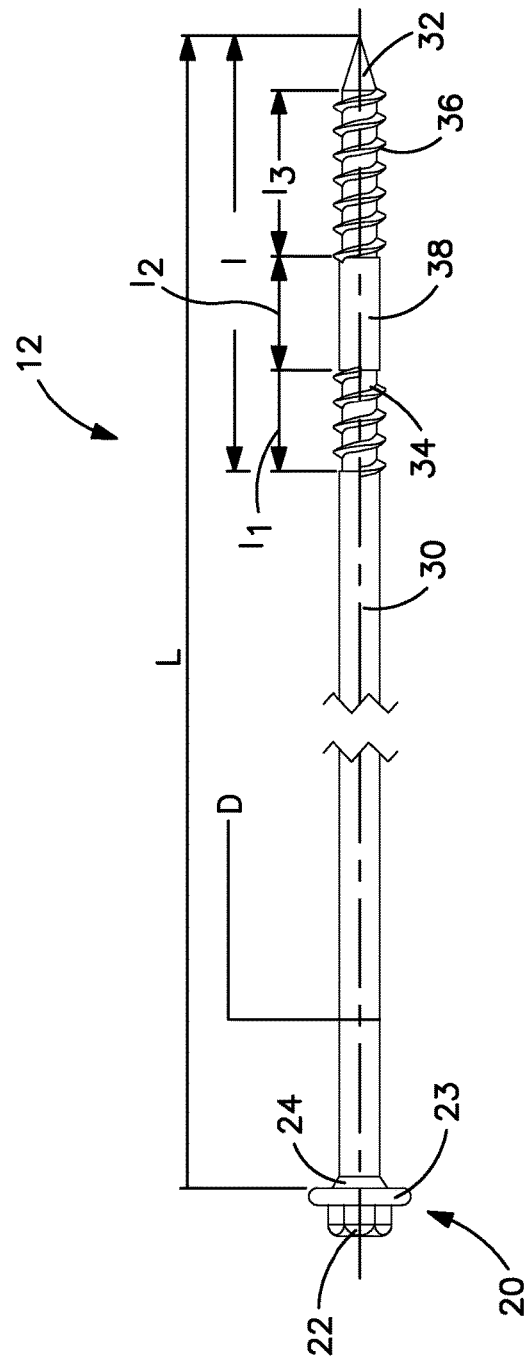
FIG. 4 is a side view, partly in diagram form and partly broken away, of a self-drilling bolt (axially rotated 90° relative to FIG. 3)

With additional reference to FIGS. 3 and 4, the shank has two threaded portions 34 and 36 which are traversed by an intermediate interrupted portion 38 of uniform diameter. The remaining portion of the shank is preferably essentially unthreaded.

Figure 5:
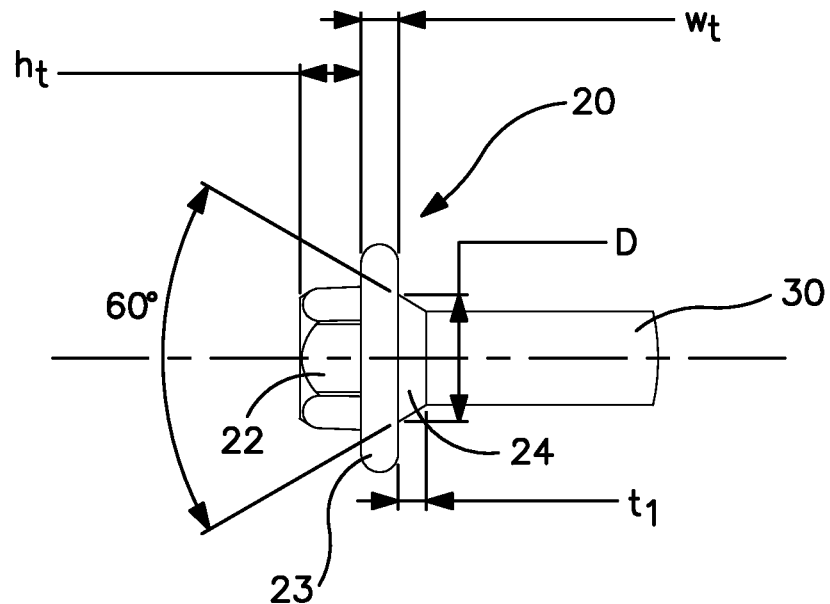
FIG. 5 is an enlarged fragmentary view, partly in diagram form, of the self-drilling bolt of FIG. 4.
Figure 6:
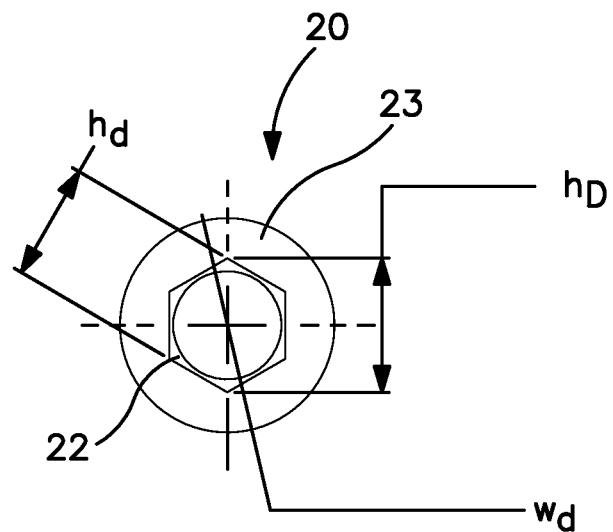
FIG. 6 is an enlarged end view, partly in diagram form, of the self-drilling bolt of FIG. 4.

With additional reference to FIGS. 5 and 6, in one embodiment, the maximum diameter $h_D$ of the hex head is 0.340 ins., the distance $h_d$ between opposed hex faces is 0.309 ins., and the longitudinal projection $h_l$ of the hex head is 0.160 ins. The integral washer 23 has a thickness $w_t$ of 0.090 ins., and a diameter $w_d$ of 0.560 ins. The transition extends a longitudinal length $t_l$ of 0.070 ins.

The shank 30 has a uniform diameter D of 0.228 ins. for the unthreaded portion. The threaded portions 34 and 36 have a pitch of 7.3 threads per inch. The longitudinal lengths of the first thread portion $l_1$, the uninterrupted portion $l_2$ and the second thread portion $l_3$ adjacent the tip are 0.56, 0.63 and 0.090, respectively.

The major diameter $M_D$ of the threads of portions 34, 36 in one embodiment is 0.302 and 0.310 ins., respectively, and the minor diameter $m_d$ of the threads is 0.201 ins.

The drill point 32 extends for a longitudinal length $l_4$ of 0.300 ins. and preferably has a half-point configuration.

The length of the fastener L for various standard lengths and the combined length l of the portions 34, 36, 38 and tip 32 in inches is set forth in Table 1 below:

TABLE 1

| LENGTH l | LENGTH L |
| --- | --- |
| 2.39 | 4.570 |
| 2.39 | 5.000 |
| 2.39 | 6.250 |
| 2.39 | 7.000 |
| 2.39 | 8.000 |
| 2.39 | 10.000 |

The foregoing specifications for one example of bolt 12 are representative of one embodiment. Other suitable self-drilling bolt embodiments can also be employed. It should also be noted that for some embodiments, the threads will not be interrupted and the threaded portion will be continuous, and in some embodiments, fully threaded to the drill point.

Figure 2:
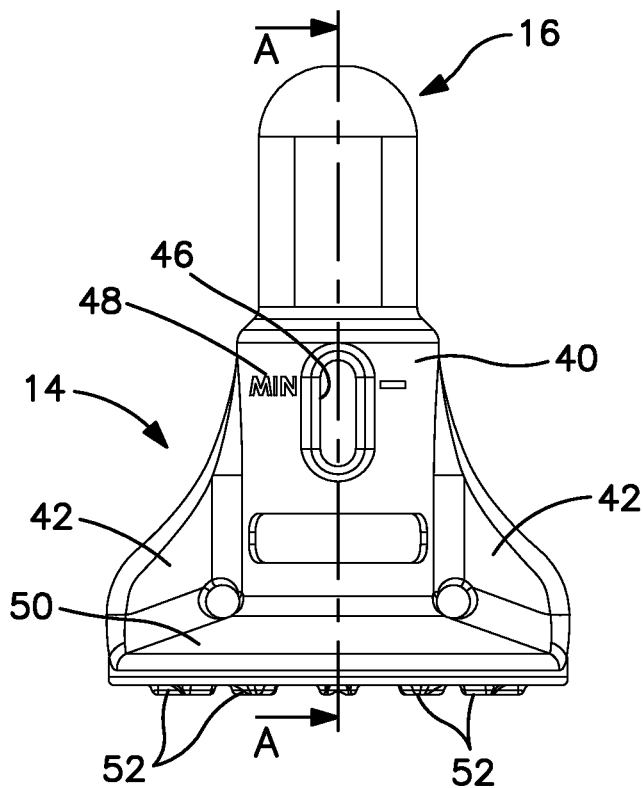
FIG. 2 is an enlarged fragmentary sectional view of the self-drilling bolt and nut assembly of FIG. 1.
Figure 2A:
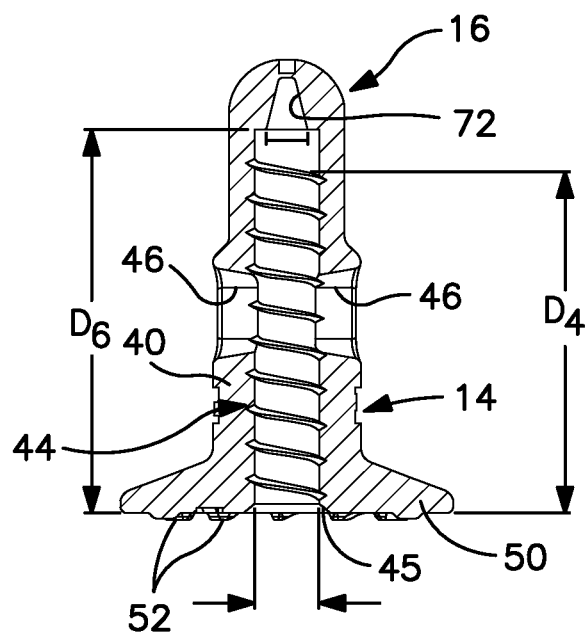
FIG. 2A is a sectional view of the nut of FIG. 2, taken along line A-A thereof.

With reference to FIGS. 2 and 2A, the nut 14 and integral cap 16 are preferably integrally formed from a plastic material. The nut body 40 preferably includes, at one end, an enlarged flange-like portion 50 with a circular array of shallow teeth-like projections 52. The projections 52 engage the member and ultimately function to resist rotation of the nut. The intermediate portion of the body is generally cylindrical. The body is centrally traversed by an axial throughbore 44 which has a threading groove complementary to that of the fastener, and includes a slightly tapered entry opening 45. A pair of contoured, wings 42 extend radially in opposed diametral relationship and axially from the enlarged portion 50. The wings 42 are adapted to apply torque and/or resist the application of torque to the nut.

The cylindrical body integrally tapers in step-wise fashion to a dome-like cap 16. The throughbore 40 continues into the cap and terminates in a conical end cavity 72.

A window 46 in one side or opposed sides of the nut body has a longitudinal dimension and is dimensioned so that the threads of the fastener may be inspected from the exterior of the nut. A minimum marking 48, including a reference line, is preferably affixed to the outside of the nut adjacent the window 46 so that sufficient threading engagement can be assured.

Figure 7:
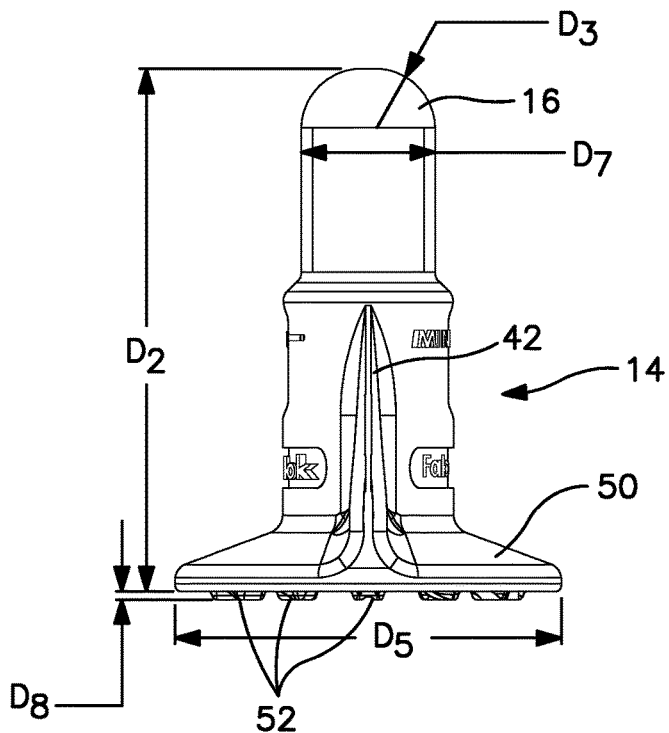
FIG. 7 is an enlarged side view of the nut of FIG. 1.
Figure 8:
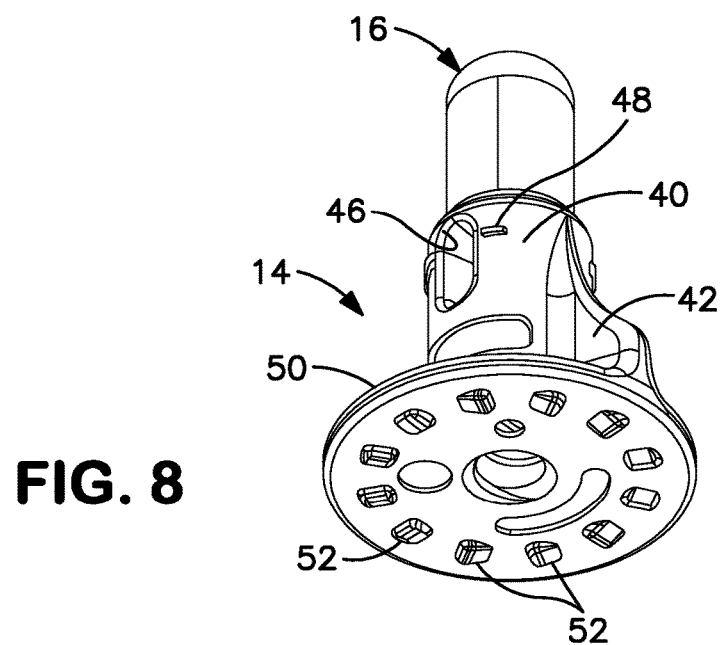
FIG. 8 is a perspective view of the nut of FIG. 7.

With reference to FIGS. 2 and 7, a preferred set of nut/cap dimensions as referenced to FIG. 2A is set forth in Table 2 below for the foregoing dimensioned fastener 10:

TABLE 2

| DESIGNATION | DIMENSIONS (ins.) |
| --- | --- |
| $D_1$ | 0.250 |
| $D_2$ | 1.770 |
| $D_3$ | .020 |
| $D_4$ | 1.330 |
| $D_5$ | 1.300 |
| $D_6$ | 1.500 |
| $D_7$ | 0.450 |
| $D_8$ | 0.020 |

The tapped bore 44 is 7.3 threads per inch with a preferred major diameter of 0.315 ins.

The foregoing specifications for one example of nut 14 compatible with the specifications for bolt 12 are representative of one embodiment. Naturally, other nut specifications may be suitable.

It should be appreciated that the nut is adapted so that the threaded portion 36 adjacent the fastener tip threadably engages with the thread grooves of the nut and penetrates sufficiently into the threaded bore of the nut so that the drill tip 32 is generally received in the conical end cavity 72 at the underside of the cap 16. The cap 16 provides a protective structure for the drill tip 32 which can have a relatively sharp point.

Figure 9:
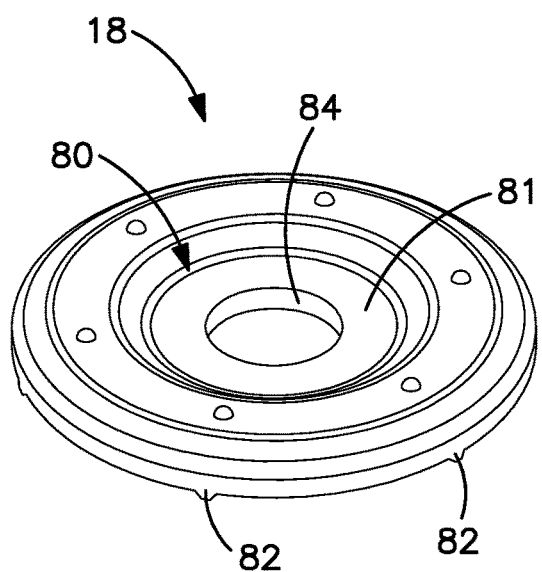
FIG. 9 is a perspective view of a plate employed in the assembly of FIG. 1.
Figure 10:
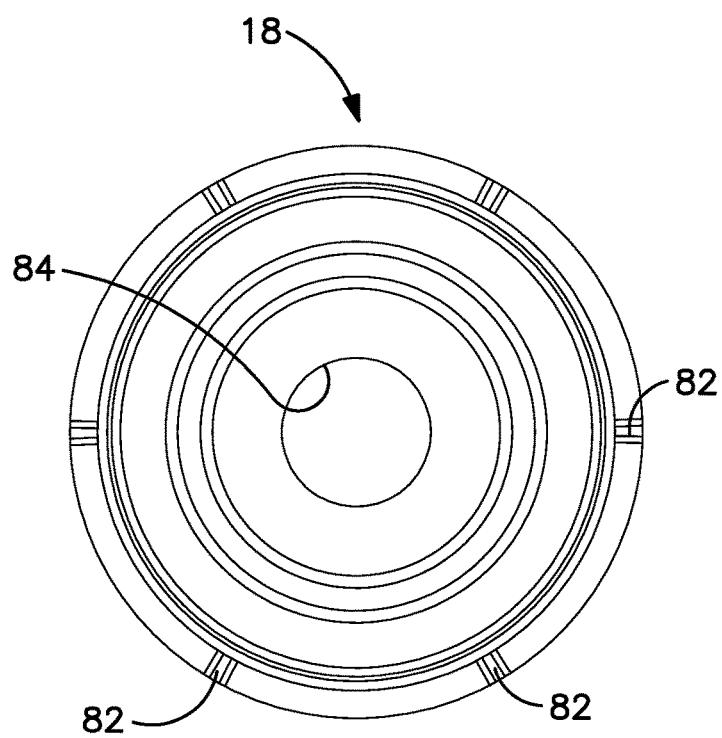
FIG. 10 is a bottom plan view of the plate of FIG. 10.

With reference to FIGS. 9 and 10, the clamping plate 18 may be formed of plastic. Alternatively, the plate may be manufactured from steel, aluminum, zinc and other materials. The plate 18 has an enlarged diameter and includes at its upper side, a recess 80 with a flat bottom surface 81 which is adapted to receive the underside of the integral washer 23 at the head and has an opening 84 so that the plate can be engaged at the underside of the transition 24 and the integral washer 23. The underside of the plate 18, which is preferably a molded plastic member, includes an arcuate or circular array of shallow teeth-like projections 82 which extend approximately the same distance as that of the projections 52 of the nut. Projections 82 also engage the adjacent fastened member upon installation to resist rotation of the plate 18. In one embodiment, the diameter of the plate is 1.25 ins., the diameter of opening 84 is 0.325 ins., and the projections 82 extend axially 0.020 ins. The minimum diameter of the recess 80 or the diameter of surface 81 is 0.57 ins. The projections 52, 82 function to enhance the clamping and locking engagement of the members secured by the fastening assembly.

Fastener assembly 10, which preferably includes the self-drilling, self-tapping bolt 12 as described, does not require pre-drilling. The bolt 12 receives the plate 18 and is torqued so that it threadably engages and advances through the first member and then through the second member. The specially configured nut 14 is then threaded onto the protruding bolt threads. After the bolt is torqued so that the head engages against the first member, the nut 14 is then tightened and torqued and/or the bolt head is further torqued so that the nut firmly engages against the surface of the second member while the plate 18 concurrently engages against the first member. The projections 82, 52 engage into the member surfaces. The cap 16 is provided to protectively cover the pointed drill tip of the bolt.

The fastener assembly typically comprises a self-drilling, self-tapping bolt, a nut and a cap and may assume various forms as further described. The cap may be merely carried by the nut and/or be integral with the nut. A fastener assembly may employ various self-drilling fastener/nut configurations. For some applications, a cap is optional.

Figure 11:
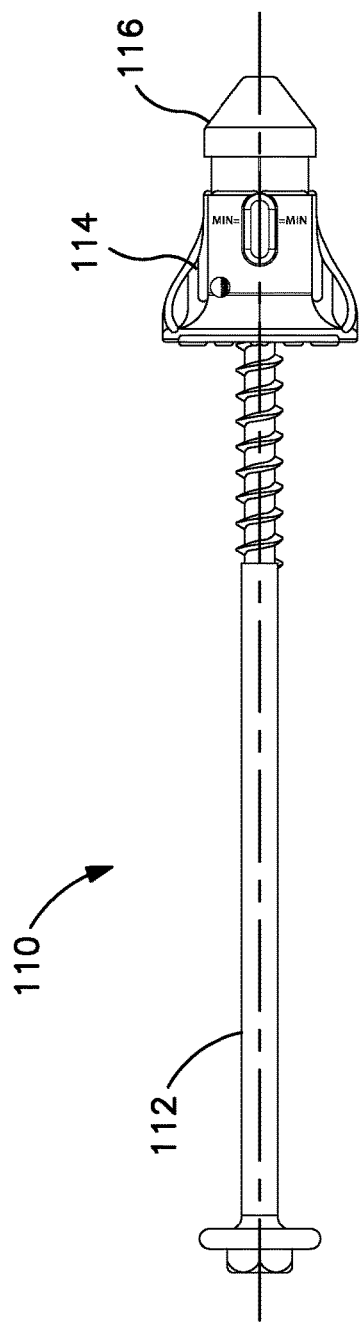
FIG. 11 is a side view of a second embodiment of a fastening assembly comprising a self-drilling bolt assembled with a nut and cap.
Figure 12:
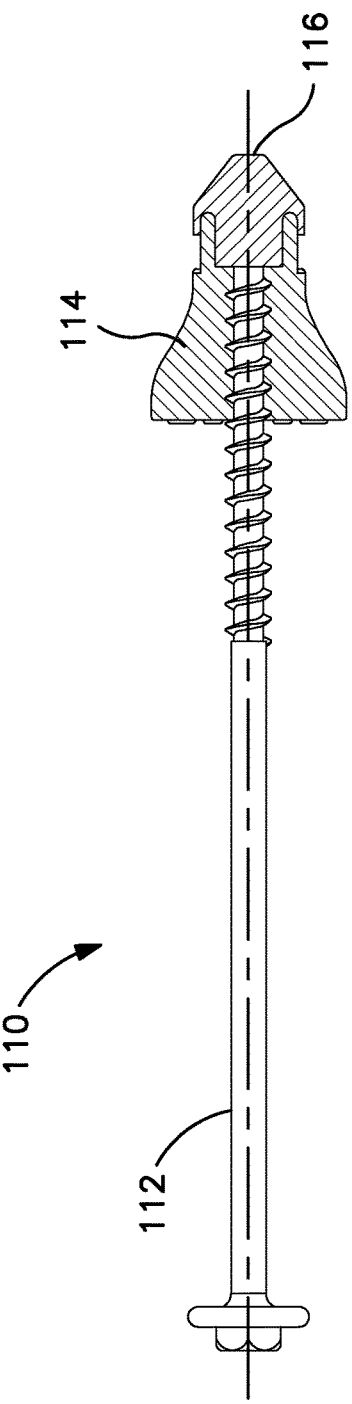
FIG. 12 is a sectional view of the bolt/nut/cap assembly of FIG. 1.
Figure 13:
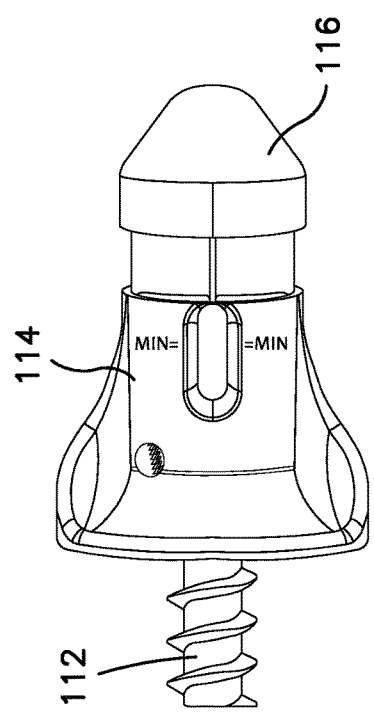
FIG. 13 is an enlarged side view of a portion of the bolt as engaged with the nut and cap of FIG. 12.

There are a number of other possible configurations for the nut and protective cap. In some instances, the protective cap may be optional. As illustrated in FIGS. 11-13, a cap 116, which may be plastic or similar form, is mounted over the end of the nut 114 and circumferentially extends around a protruding side surface. It should be noted that a plate may also be alternatively included in the assembly of FIGS. 11 and 12.

Figure 14:
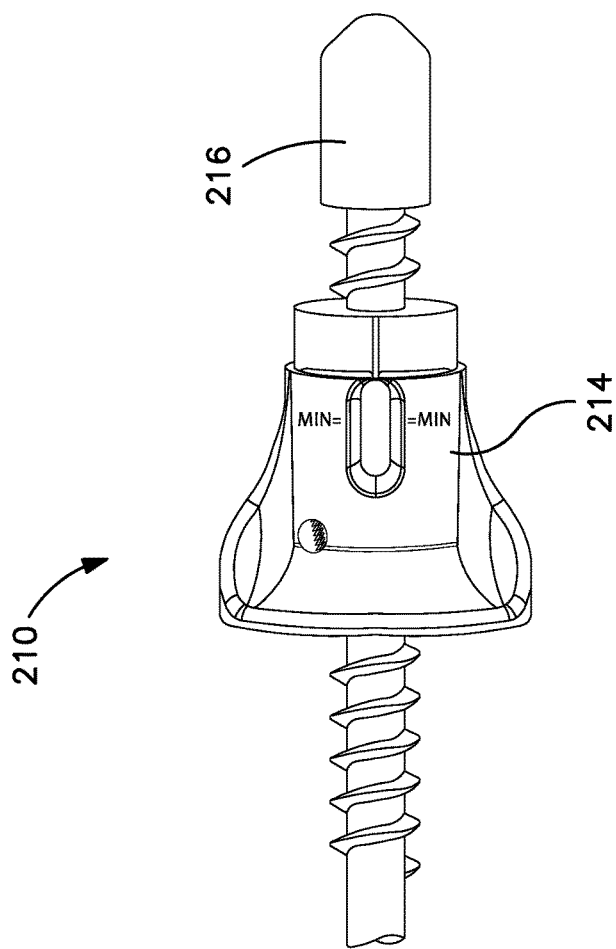
FIG. 14 is an enlarged side view of a portion of a self-drilling bolt/assembled with a third embodiment of a nut and a cap.

A second form of a nut of a fastener assembly 210 is illustrated in FIG. 14 wherein the nut 214 is configured to receive a more abbreviated cap 216 which is mounted in place after the nut is tightened.

Figure 15:
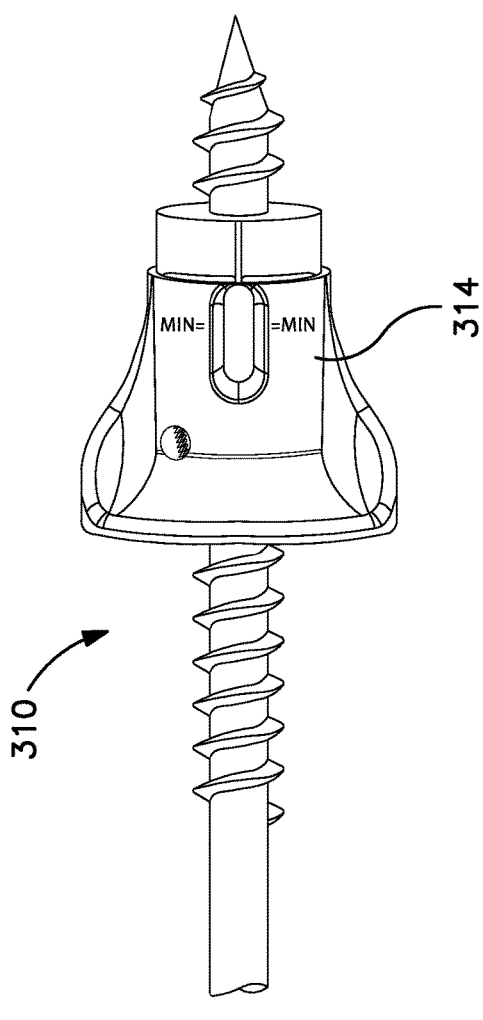
FIG. 15 is an enlarged side view of a portion of the self-drilling bolt assembled with a fourth embodiment of a nut.

Another fastener assembly 310 illustrated in FIG. 15 comprises a nut 314 which is not configured to receive a cap and the pointed end of the fastener, which extends beyond the end of the nut, is left in an unprotected, protruding form.

Figure 16:
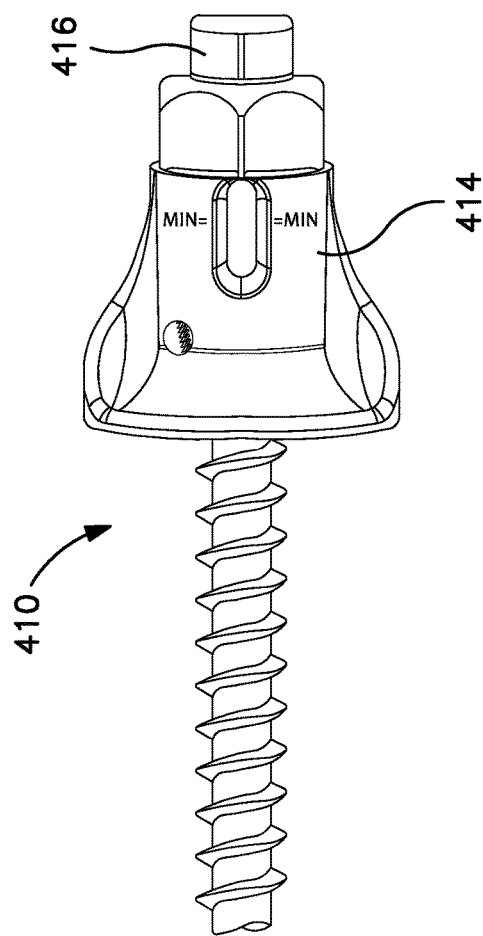
FIG. 16 is an enlarged side view of a portion of a self-drilling bolt assembled with a fifth embodiment of a nut and cap.

For the fastener assembly 410 in FIG. 16, the nut 414 has a fixed cap 416. The cap is integrated with the nut and is constantly retained with the nut. The end of the self drilling bolt is fully received within the cap 410.

Because each of the fasteners for the fastening assemblies 110, 210, 310 and 410 employ a bolt 112 which is self-drilling and preferably self-tapping, the drill end points of the fastener, if projecting beyond a nut, may present an exposed sharpened point which could prove injurious in certain environments. Accordingly, for some of the applications, a protective cap 116, 216 and 416 is preferably provided.

Figure 17A:
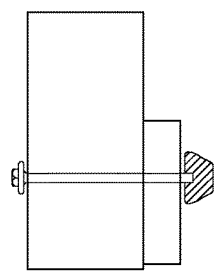
FIG. 17A is a side sectional view illustrating an application of a bolt/nut assembly for fastening a deck post.
Figure 17B:
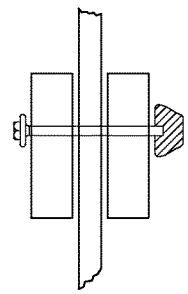
FIG. 17B is a side sectional view illustrating an application of a bolt/nut assembled for fastening a ledger.
Figure 17C:
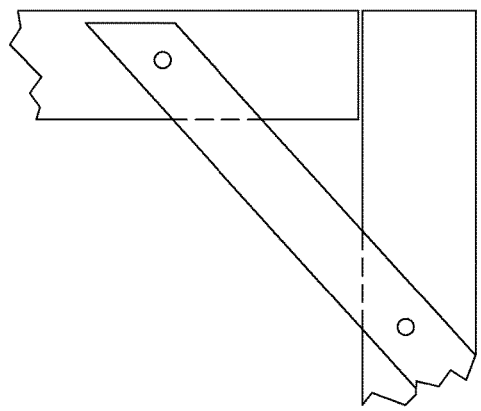
FIG. 17C is a side elevational view illustrating an application of a pair of bolt/nut assemblies for a bracing.
Figure 17D:
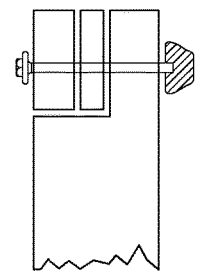
FIG. 17D is a side sectional view illustrating an application of the bolt/nut assembly for fastening a carrying beam.
Figure 17E:
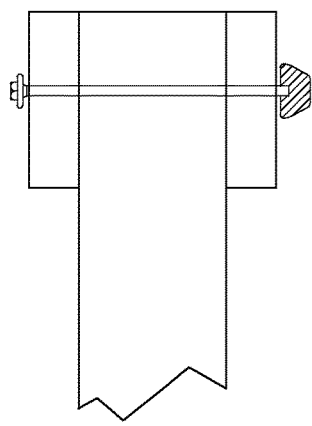
FIG. 17E is a side sectional view illustrating an application of a bolt/nut assembly in conjunction with fastening a carrying beam.
Figure 17F:
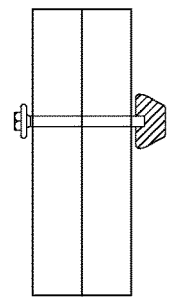
FIG. 17F is a side sectional view illustrating an application of a bolt/nut assembly for fastening 2 plies of material.
Figure 17G:
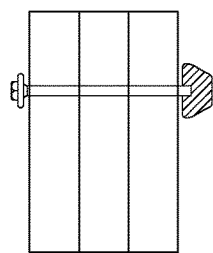
FIG. 17G is a side sectional view illustrating an application of a bolt/nut assembly for fastening together 3 plies of material.
Figure 17H:
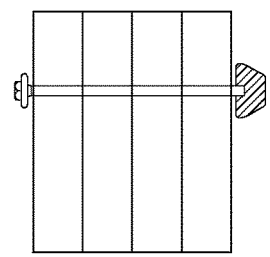
FIG. 17H is a side sectional view illustrating an application of a nut/bolt assembly for fastening together 4 plies of material.
Figure 18:
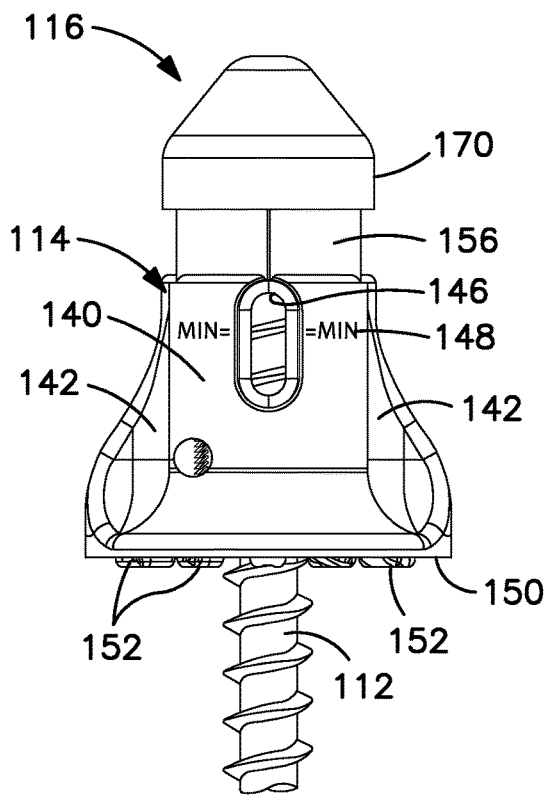
FIG. 18 is an enlarged front view of a portion of a self-drilling bolt threadably engaged with a nut having a cap.

The fastener assemblies have a wide range of applications and are particularly adapted to connect members under a load as illustrated in FIGS. 17A-17H. FIG. 17A shows a fastener assembly as employed to fasten a deck post. FIG. 17B illustrates a fastener assembly as employed to fasten a ledger. FIG. 17C illustrates a pair of fastener assemblies as employed to secure a corner brace to a pair of perpendicular members. FIGS. 17D and 17E show the fastener assembly as employed in connection with fastening members to carrying beams. FIGS. 17F-17H show a fastener assembly connecting together plies of 2, 3 and 4 ply constructions, respectively. It will be appreciated that the fastener length may be dictated by the given application.

With reference to FIGS. 29 and 30, for one embodiment a bolt 112 has a head 120 with a No. 3 spider drive 122 or other suitable structure for drivably engaging the bolt. A conical transition portion 124, which may be 40°, extends a distance t for approximately 0.18 inches and tapers into an unthreaded shank portion 126. The unthreaded shank portion 126 extends to an intermediate portion wherein a threaded portion 136 ultimately tapers into a gimlet point 132 at a 25°-30° angle. The thickness h of the head 120 is approximately 0.100 inches. The threaded shank portion preferably has a minor diameter d of 0.172 inches and a major diameter D of 0.260 inches. The thread 136 is preferably a No. 14 thread with a pitch of 7.5 threads per inch.

Various bolt lengths L may be provided ranging, for example, from 2.875 length to 18.00 inches. For some embodiments, the length A of the threaded portion to the tip is 2.00 inches for each of the foregoing noted bolt lengths L. In one embodiment wherein the length is 1.625 inches, the length A is 1.250 inches. The diameter of the head 120 is preferably 0.625 inches.

The thread 136 of the bolt is selected to threadably mate with a nut for locking the fastening assembly in place while concurrently providing a self-drilling function. Accordingly, the bolt thread 136 has fewer threads per inch and a greater pitch than corresponding lag bolts for a similar fastening function. It is preferred that the pitch be less than or equal to 8.0 threads per in.

With reference to FIGS. 18-21, nut 114 comprises a rugged cast body 140 with at least two wings 142 to facilitate tightening the nut. The body includes a central threaded bore 144 which is complementary with the threads 136 of the fastener. The frontal face includes a window 146 with a minimal bolt penetration level marking 148 so that the threads may be seen in the window and a minimal thread engagement for fastening integrity may be ensured. The proximal end surface 150 of the nut flares into a large surface area and includes tooth-like projections 152 which, upon tightening, engage into the adjacent surface of the member which is to be connected. The small diameter distal end portion 154 of the nut 140 includes an intermediate hexagonal or square torque surface 156 for applying a torque to the nut or preventing the nut from rotating. The interior of the end portion forms an annular cavity 158. The extreme end forms an outer cylindrical (or interrupted cylindrical) surface 160 which is traversed by a circumferential (or interrupted circumferential) retaining ring 162.

The cap 116 is a dome-like member which has a circular band structure 170 with an internal annulus 172 which encircles a substantially conical cavity 174. A retention recess 176 is formed at the interior of the annulus and mates with the retaining ring 162 so that the cap is generally retained with the end of the nut. A cylindrical extension 178 mates with the walls of cavity 158 and is closely received therein in the nut/cap position of FIGS. 18 and 19. The cap 116 is preferably a molded plastic member.

Figure 19:
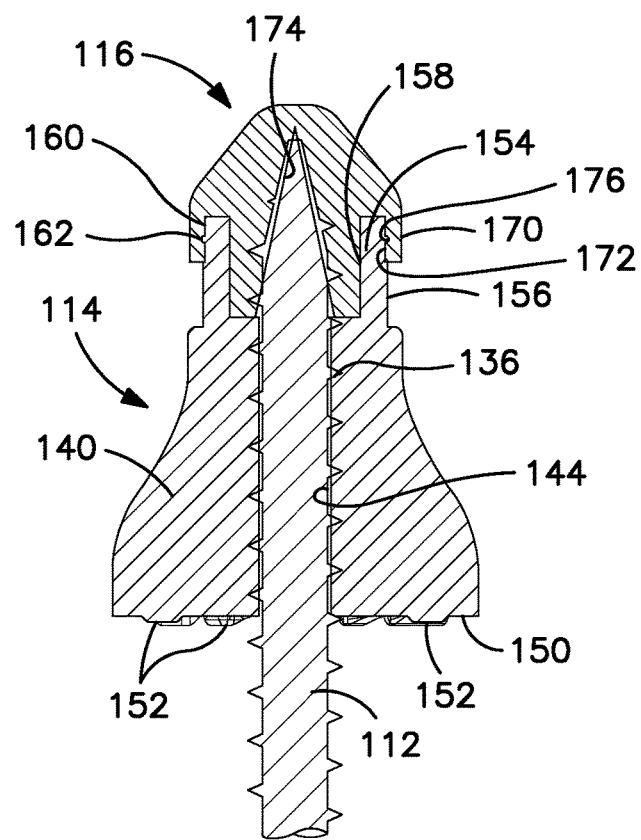
FIG. 19 is a central sectional view of the bolt, nut and cap of FIG. 18.

As the drill tip 132 of the fastener enters the cap 16, the drill tip threads engage initially into the conical wall of cavity 174 (FIG. 19). As the fastener penetration continues, the cap 116 separates and is lifted from the nut 114, as best illustrated in FIGS. 20 and 21. The threading engagement of the drill tip threads with the conical cavity causes the cap 116 to be retained to the bolt drill tip 132. It will be appreciated that the configuration accommodates situations wherein the length of the self-drilling bolt extends beyond the end of the nut when the nut is tightened and locked in position and allows for the protective cap to, nevertheless, remain attached to the drill point.

Figure 22:
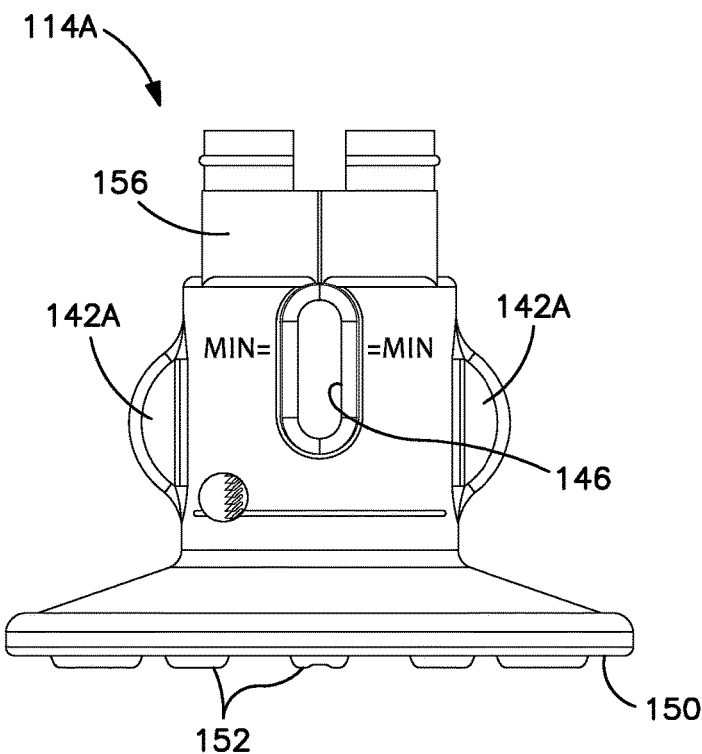
FIG. 22 is an enlarged frontal view of another embodiment of a nut.
Figure 23:
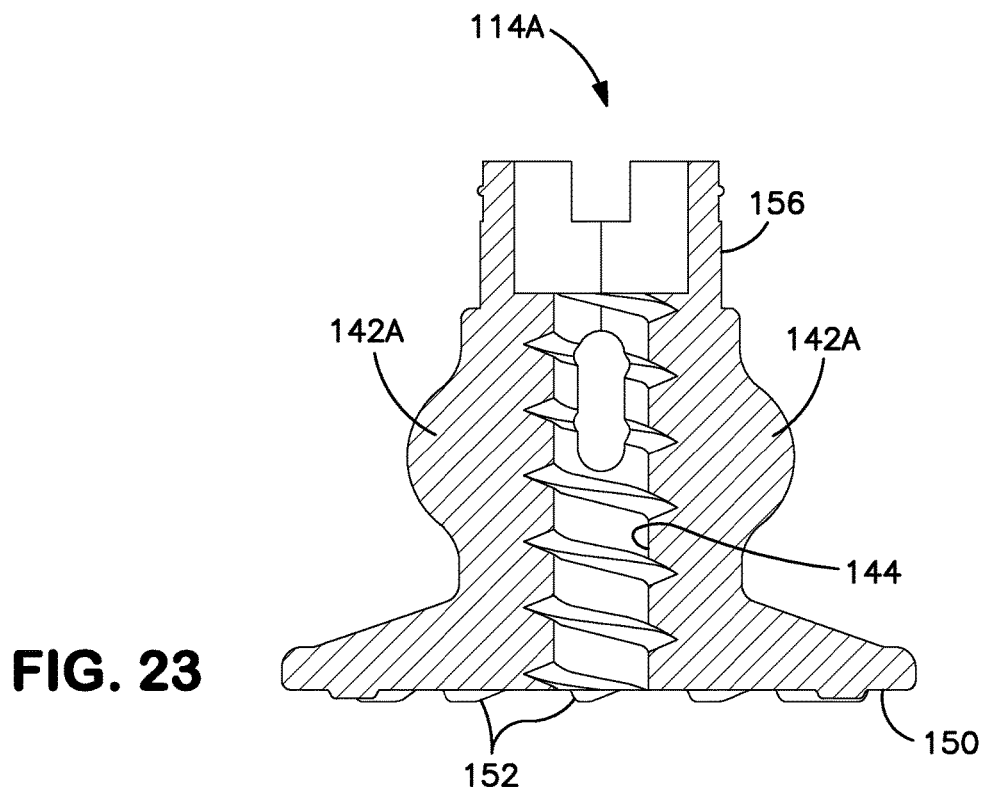
FIG. 23 is a sectional view of the nut of FIG. 22.

With reference to FIGS. 22 and 23, nut 114A includes an alternative configuration for the wings 142A.

Figure 24:
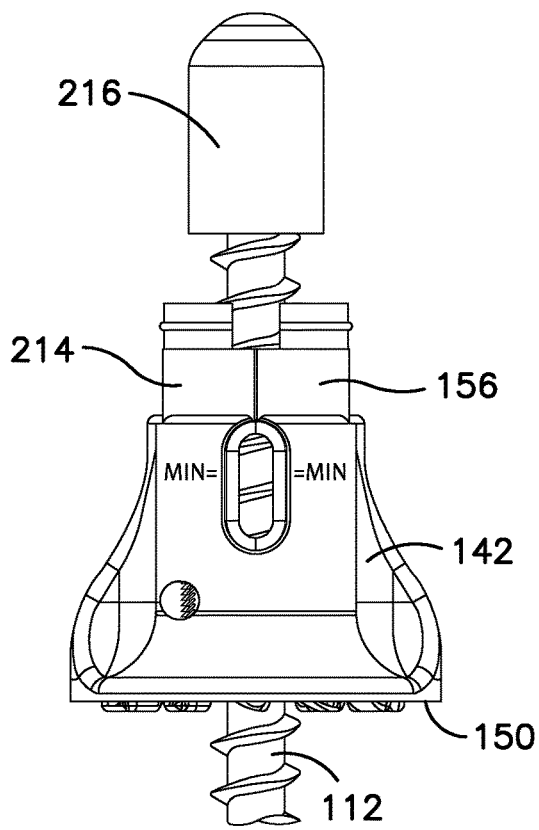
FIG. 24 is a front view of a portion of a self-drilling bolt threadably engaged with a nut and a cap.
Figure 25:
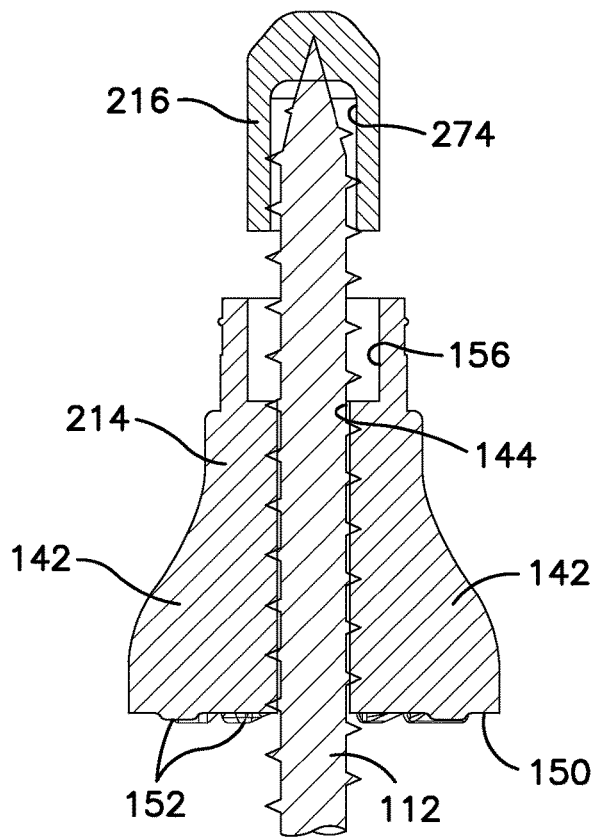
FIG. 25 is a central sectional view of the bolt, nut and cap of FIG. 24.

With reference to FIGS. 24 and 25, the cap 216 may have an elongated tubular form. Cap 216 is normally mounted over the end of the drill tip 132 by the contractor after installation of the bolt and nut. Cap 216 may be dimensioned so that for installations wherein the drill point does not protrude significantly beyond the end of the nut, the cap 216 is closely received in the annulus 158 of the nut. The interior of the cap includes a generally cylindrical bore 274. The walls of the bore may be somewhat resilient. After the drill tip is threaded through and is driven through the nut and the bolt/nut assembly tightened, the cap 216 is forced onto the drill point 132. The thread 136 engages into the cap, and the extreme terminus of the tip 132 slightly pierces into the interior end surface of the cap. If the bolt is threaded beyond the nut, the cap is correspondingly spaced from the end of the nut. Even when the drill point protrudes substantially beyond the nut, the thread engagement into the wall of the bore 274 retains the cap over the received drill point to provide a protective cover, as best illustrated in FIGS. 24 and 25.

Figure 26:
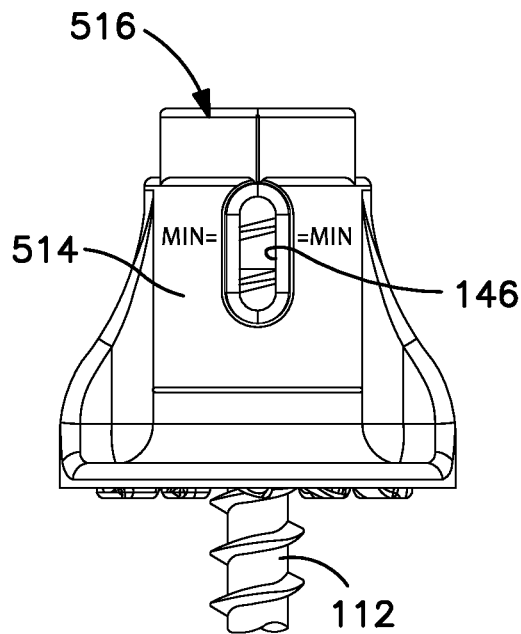
FIG. 26 is a front view of a portion of a self-drilling bolt engaged with a nut having a fixed cap.
Figure 27:
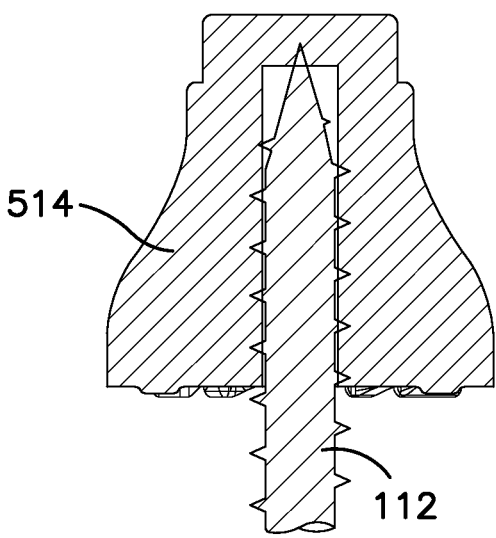
FIG. 27 is a central sectional view of the bolt, nut and fixed cap of FIG. 26.

For some embodiments, such as illustrated in FIGS. 16, 26 and 27, the cap 416, 516 is integrated with the nut 414, 514 and is rigidly attached. Accordingly, the cap defines a fixed limit for penetration of the drill tip which may only slightly penetrate into the end surface or be deformed upon engagement with the interior end surface. The advantage of these embodiments is that the cap is rigidly fixed with the nut. However, if the length of the fastener is not properly selected, the nut cannot be properly tightened. In these embodiments, the window 146 is very important to ensure that there is a minimal amount of threading engagement between the fastener and the nut.

Figure 28:
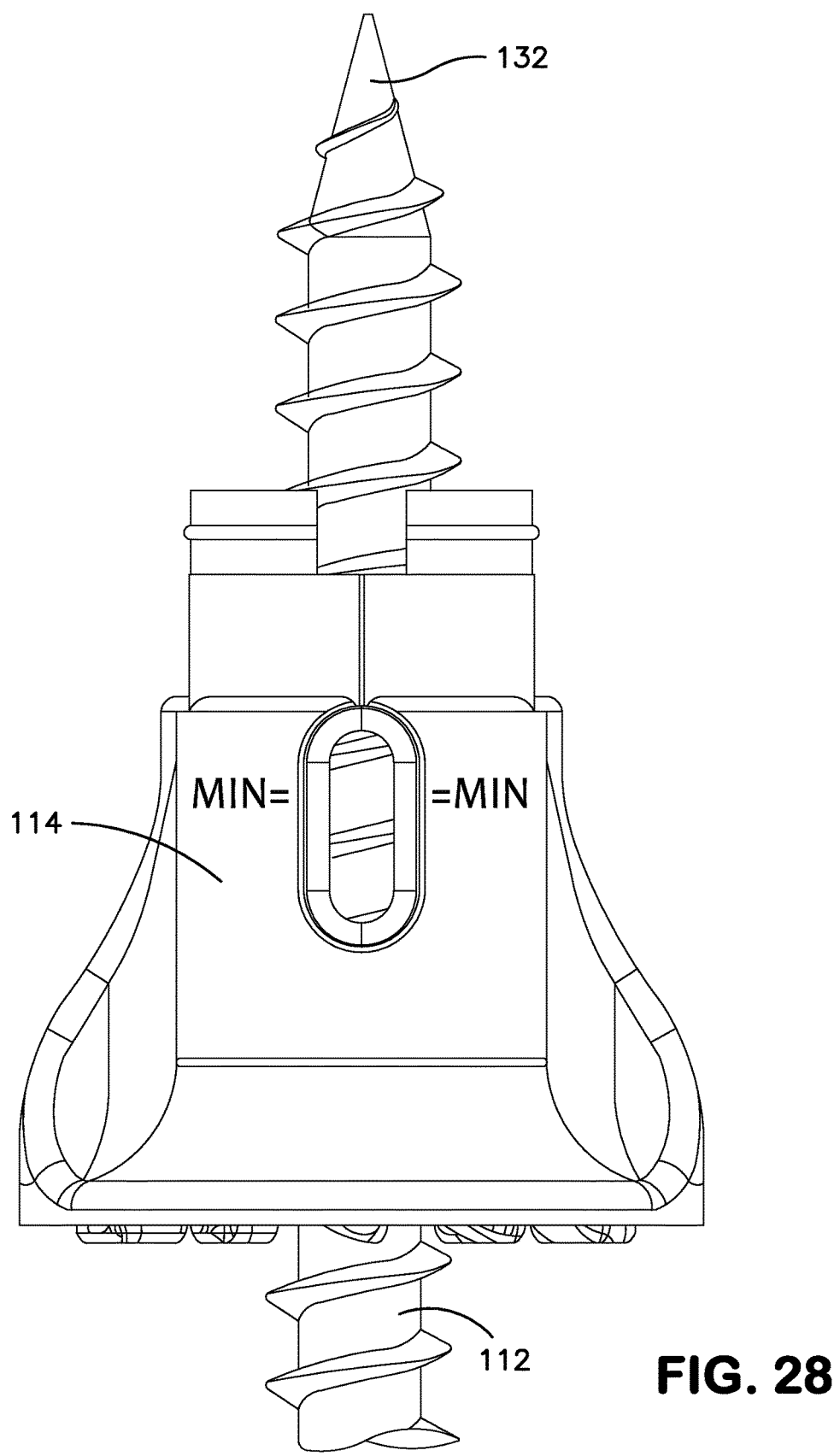
FIG. 28 is a front view of a portion of a self-drilling bolt and a nut with the bolt threadably engaged with a nut.

For some applications, as best illustrated in FIG. 28, a cap is not required. The drill tip 132, therefore, simply penetrates through the end of the nut 114A and may protrude substantially beyond the end of the nut. This embodiment can be advantageously employed where the protruding bolt tips are ordinarily inaccessible.

Another embodiment of a fastener assembly is illustrated in FIGS. 31-34. The assembly employs a fastener 612 which is a bolt with a drill tip 632. The shank includes an alternating series of threaded and unthreaded portions 630, 626. The threaded portion toward the distal end of the bolt tapers into the threaded drill tip 632. The head 620 includes an internal socket drive. The unthreaded portions have a diameter between 0.190 and 0.226. A chamfer 624, under the head, is configured to urge centering of the washer. In one embodiment, the shank is coated with lubrication for better torque. The threaded tip 536 is ¾-1 inch long to accommodate a variety of positions. The helical thread 634 of the threaded portions has a higher thread pitch than typical wood threading. The point 633, which is designed to decrease engagement time and reduce splitting, has an angle preferably greater than or equal to 30°. In this embodiment, the fastener is torqued through the members. The unthreaded portions 626 provide relief segments, one of which may be broken off after the nut is threaded to the fastener.

The nut 614, as illustrated, in FIG. 32 includes a body 640 with a series of grips or serrations 642 to facilitate grasping the nut. The body includes a central threaded bore 644 wherein the thread track is complementary with the threads on the fastener. The proximal end 650 of the nut includes an integrated washer 660 which spreads the load over a wider surface area. The center hole 662 is perfectly matched to the underside of the fastener to reduce tilt and off-center tendencies. An exterior ring 666 seals around the rim of the washer 660. The serrations 642 allow for a hand installation. The receiver material extends from the top on the nut to accept up to ½ inch in excess threading. The window 646 is employed so that the threading may be inspected to ensure proper fastener penetration with the nut. A flat band is also preferably provided so that various information can be printed onto the nut. The nut may be formed from plastic or other metallic materials. In some embodiments, the receiver material in the form of an insert may be formed of metal and the remainder may be formed of a plastic overmold.

Figure 34:
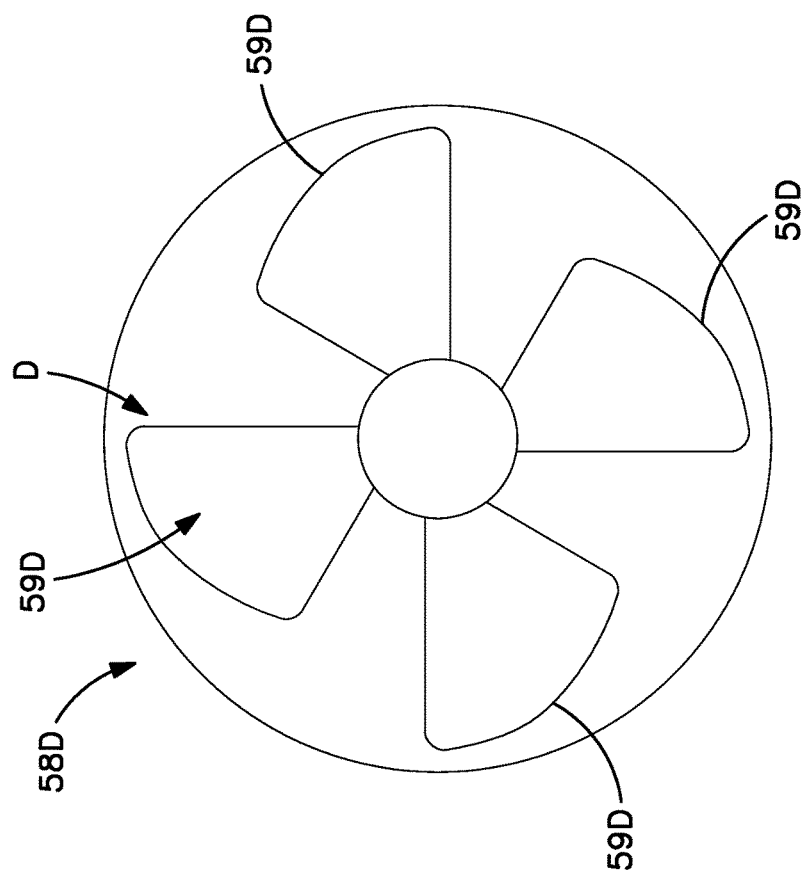
FIG. 34 is an enlarged bottom plan view of the washer of FIG. 33.
Figure 33:
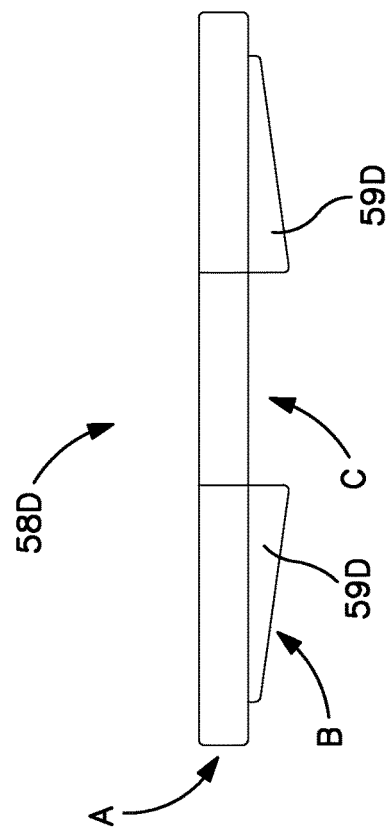
FIG. 33 is an enlarged side view of a washer employed with the nut of FIG. 32.

With respect to FIGS. 33 and 34, a finned washer 680 may also be employed and may be inserted up into the end of the nut in place of washer 660. Locking fins 690 are employed to enhance the gripping relationship and tightening of the nut during the fastening process.

It will be appreciated that the foregoing fastener assemblies can be employed to efficiently join adjacent the structural members under load conditions without requiring a pre-drilling of a throughbore. The fastener 112, 612 can be torqued and will self-tap and self-drill into the members. After the fastener is fully driven, a nut 14, 114, 214, 314, 414, 514, 614 can be threaded to the end of the bolt or the thread engagement may be commenced prior to full torquing of the bolt. The sharp drill tip, in some embodiments, is protected by a cap 16, 116, 216, 416, 516 which is designed to accommodate any length mismatches between the fastener and the application that would cause the drill tip 32, 132, 632 to extend beyond the end of the bolt. For some embodiments, the protruding ends of the bolt are snapped off or removed so that a cap is not necessary.

The invention claimed is:

1. A fastener/locking assembly comprising:
 a self-drilling fastener comprising a head and a shank extending from said head to a drill tip, said shank having a first unthreaded portion adjacent said head and a second portion having a thread;
 a nut comprising a body having at one end a locking surface and at an opposite second end a circumferential retaining ring having a generally cylindrical surface traversed by a recess, said body having a central bore with an internal surface complementary to said thread; and
 a cap received in said recess and retained with said nut wherein upon threadably engaging said fastener with said nut and advancing said fastener relative to said nut, said drill tip is received in said cap, and having a closed end and a proximal end traversed by an annulus, an interior wall of which has a recess which mates with said retainer ring to retain said cap with said nut.

2. The fastener/locking assembly of claim 1 wherein said nut has a window.

3. The fastener/locking assembly of claim 1 wherein said nut has at least two wings.

4. The fastener/locking assembly of claim 1 wherein said nut body is received in said annulus.

5. The fastener/locking assembly of claim 1 wherein said locking surface of said nut comprises a plurality of projections.

6. The fastener/locking assembly of claim 1 wherein said thread is approximately 7.5 threads per inch.

7. The fastener/locking assembly of claim 1 wherein the length of said threaded portion and said drill tip is approximately 2.00 inches.

8. A fastener/locking assembly comprising:
 a self-drilling fastener having a head and a shank extending from said head and terminating in a drill tip, said shank having a first unthreaded portion adjacent said head and a second threaded portion having a thread adjacent said drill tip;
 a nut comprising a body having at one end a locking surface, said body having a central bore defined by a surface complementary to said threaded portion, said fastener threadably receivable in said nut, and said exterior surface being configured to resist or permit application of torque; and
 a cap carried by said nut so that when said fastener is threadably received in said nut, said drill tip is received in said cap and said cap separates from said nut.

9. The fastener/locking assembly of claim 8 wherein said shank has a plurality of threaded and unthreaded portions.

10. The fastener/locking assembly of claim 8 wherein said nut has a window which permits a visual inspection of said thread upon sufficient engagement with said nut.

11. The assembly of claim 8 wherein said fastener has a pitch of less than or equal to 8.0 threads per inch.

* * * * *